Feb. 7, 1933.  R. K. LEE  1,896,962

VIBRATION DAMPER

Filed Sept. 22, 1930

INVENTOR
ROGER K. LEE.
BY
ATTORNEY

Patented Feb. 7, 1933

1,896,962

UNITED STATES PATENT OFFICE

ROGER K. LEE, OF HIGHLAND PARK, MICHIGAN, ASSIGNOR TO CHRYSLER CORPORATION, OF DETROIT, MICHIGAN, A CORPORATION OF DELAWARE

VIBRATION DAMPER

Application filed September 22, 1930. Serial No. 483,545.

This invention relates to an improved crank shaft vibration damper for an internal combustion engine.

The main objects of the invention are to provide an improved vibration damping device of the type which has a weighted inertia member yieldably secured to a crank shaft and adapted for movement relative thereto; to provide improved material in an inertia member of this kind which can be readily moulded and conveniently attached to the yieldable connecting element by which the inertia member is supported on a crank shaft; to provide a non-metallic composition for this purpose; to provide a flexible connecting element which unites readily with the non-metallic composition so as to become an integral part thereof; to provide a yieldable connection of this kind which has a vulcanized bond with a supporting member that is securable to a crank shaft; to provide a rigid cup-shaped support, or receptacle for the inertia member and yieldable connecting element in which the inertia member and yieldable element may be moulded together; and to provide a receptacle of this kind in which the yieldable element may be simultaneously vulcanized to the receptacle and moulded integrally with the inertia member.

An illustrative embodiment of the invention is shown in the accompanying drawing, in which.

Figure 1:
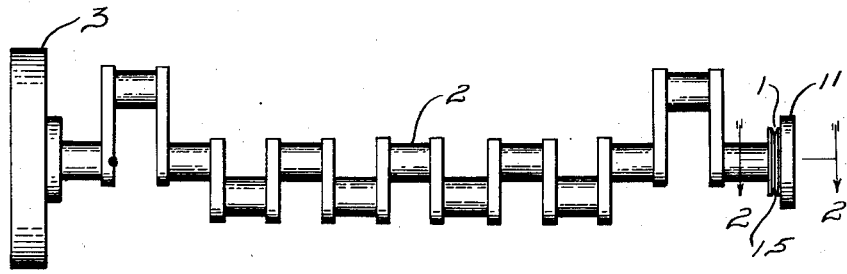
Fig. 1 is a side elevation of a crank shaft embodying my improved vibration damper.
Figures 2, 3:
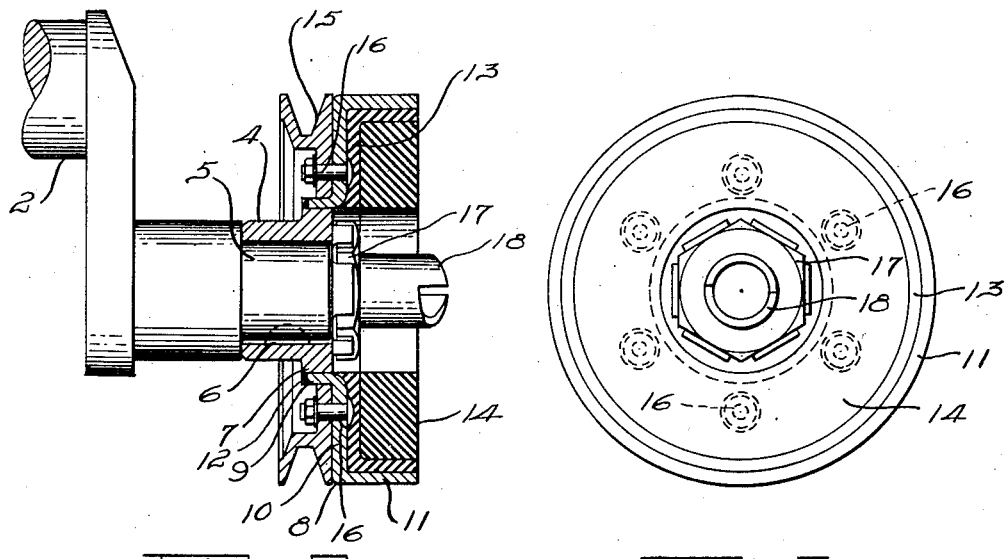
Fig. 2 is a horizontal section taken on the line 2—2 of Fig. 1.
Fig. 3 is an outer end elevation of the vibration damper shown in Figs. 1 and 2.

In the form shown, the vibration damper 1 is mounted on the front end of a crank shaft 2 which has a flywheel 3 of conventional construction. The damper 1 includes a sleeve 4 which is adapted to fit on a reduced section 5 of the front end of the crank shaft 2. The sleeve 4 is provided with a key 6 by which it is secured against movement relative to the crank shaft 2. Mounted concentrically on a radial shoulder 7 of the sleeve 4 is a support, or receptacle 8 which includes an inner axial flange 9, an end wall 10 and an outer peripheral wall 11. The edge of the inner axial flange 9 is welded to the radial shoulder 7 of the sleeve 4 at 12.

Mounted in the interior of the support, or receptacle 8 is a layer, or lining 13 comprising yieldable material, such as rubber, which is rigidly secured by vulcanization to the inner surfaces of the end wall 10 and peripheral wall 11 of the receptacle 8. An inertia ring 14 is located in the receptacle adjacent the lining 13 thereof. This member comprises a non-metallic matrix, preferably a rubber composition in which an ingredient, such as lead peroxide, or other weighty substance is incorporated. The inertia ring may be formed of bakelite or any other conveniently mouldable non-metallic substance to which a resilient connecting element is securable.

The yieldable rubber lining 13 and the inertia ring 14 may be conveniently secured in the receptacle 8 by moulding the two elements in the latter at one time so as to form a rigid bond between the walls of the receptacle and the yieldable rubber element, and between the latter and the inertia member. This moulding operation may be accomplished before the receptacle 8 is assembled on the sleeve 4.

The damper has a pulley wheel 15 which is rigidly secured to the end wall 10 of the receptacle by bolts 16. The sleeve 4 is detachably held in place by a nut 17 which is threaded on the reduced section 5 of the crank shaft 2. A crank engaging part 18 is formed on the foremost extremity of the reduced section 5.

In operation the yieldable element 13 allows limited relative movement between the inertia member and the crank shaft. This action counteracts the normal vibration of the crank shaft and prevents regular, timed impulses from being created. The presence of rubber in the inertia member allows the connecting member and inertia member to be integrally moulded together in the receptacle, or support 8 while at the same time the heat present during moulding vulcanizes the connecting member to the inner surfaces of the receptacle. The receptacle preferably comprises brass plated steel to which rubber readily bonds and it is welded to the sleeve 4 after the inertia member has been molded therein.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. A vibration damper including a member securable to a crank shaft, a yieldable element secured to said member, an expansible enertia member integrally formed on said element comprising a non-metallic matrix adapted to fuse with the material of said yieldable element and having comminuted weighty material therein, and rigid means on said member overlapping the outer extremities of said inertia member for opposing expansion thereof under centrifugal action.

2. A vibration damper including a support, an expansible inertia member, a rigid element on said support surrounding the outer extremities of said inertia member, and a yieldable non-metallic element located between and secured to said rigid element and inertia member.

3. A vibration damper including a support securable to a crank shaft, an inertia member including a non-metallic matrix and a comminuted weighty substance, a flange on said support surrounding said inertia member and a yieldable rubber element secured to the inner periphery of said flange and inertia member.

4. A vibration damper including a member securable to a crank shaft; a receptacle having an outer peripheral wall, an inner axial flange and an end wall; said flange being secured to said member; a yieldable rubber lining secured to said peripheral and end walls, and an inertia member in said receptacle comprising a weighted rubber composition, said inertia member being integral with the lining of said peripheral and end walls.

5. A vibration damper including a member securable to a crankshaft, a receptacle rigidly secured to said member including an outer peripheral wall and an inner end wall, a yieldable lining secured to said peripheral and end walls, and an inertia element located in said receptacle and secured to said lining.

6. A vibration damper including a member securable to a crankshaft, a receptacle rigidly secured to said member including an outer peripheral wall and an inner end wall, a yieldable rubber lining vulcanized to said peripheral and end walls, and an inertia element located in said receptacle and vulcanized to said lining.

7. A vibration damper including a member securable to a crankshaft; a receptacle having an outer peripheral wall, an inner axial flange and an end wall; said flange being secured to said member; a yieldable rubber lining secured to said peripheral wall; and an inertia member in said receptacle comprising a weighted rubber composition, said inertia member being integral with the lining of said peripheral wall.

ROGER K. LEE.